(12) United States Patent
Kikuchi

(10) Patent No.: US 8,473,737 B2
(45) Date of Patent: Jun. 25, 2013

(54) AUTHENTICATION DEVICE AND METHOD USING ELECTRONIC CERTIFICATE FILES HAVING HIERARCHICAL RELATIONSHIP

(75) Inventor: Yusaku Kikuchi, Chofu (JP)

(73) Assignee: Seiko Epson Corporation, Tokyo (JP)

( * ) Notice: Subject to any disclaimer, the term of this patent is extended or adjusted under 35 U.S.C. 154(b) by 928 days.

(21) Appl. No.: 12/016,778

(22) Filed: Jan. 18, 2008

(65) Prior Publication Data

US 2009/0019519 A1   Jan. 15, 2009

(30) Foreign Application Priority Data

Jan. 19, 2007   (JP) ................................. 2007-010682

(51) Int. Cl.
*H04L 29/06* (2006.01)
*H04L 9/32* (2006.01)
*G06F 7/04* (2006.01)
*G06F 15/16* (2006.01)
*G06F 17/30* (2006.01)

(52) U.S. Cl.
USPC ........... 713/157; 713/158; 713/159; 713/175; 726/10

(58) Field of Classification Search
USPC ........................................................ 713/157
See application file for complete search history.

(56) References Cited

U.S. PATENT DOCUMENTS

| | | | | |
|---|---|---|---|---|
| 5,781,629 A | * | 7/1998 | Haber et al. | 713/177 |
| 6,233,577 B1 | * | 5/2001 | Ramasubramani et al. | 1/1 |
| 6,301,658 B1 | * | 10/2001 | Koehler | 713/155 |
| 6,513,116 B1 | * | 1/2003 | Valente | 713/155 |
| 6,584,565 B1 | * | 6/2003 | Zamek | 713/156 |
| 6,990,583 B2 | * | 1/2006 | Matsuyama et al. | 713/175 |
| 7,130,999 B2 | * | 10/2006 | Yasala et al. | 713/157 |
| 7,149,894 B2 | * | 12/2006 | Futamura et al. | 713/157 |
| 7,225,341 B2 | * | 5/2007 | Yoshino et al. | 713/193 |
| 7,237,107 B2 | * | 6/2007 | Wray | 713/157 |
| 7,383,434 B2 | * | 6/2008 | Wildish et al. | 713/157 |
| 7,558,952 B2 | * | 7/2009 | Kumagai et al. | 713/156 |
| 7,568,095 B2 | * | 7/2009 | Thornton et al. | 713/156 |
| 7,631,183 B2 | * | 12/2009 | Brown et al. | 713/157 |
| 7,640,427 B2 | * | 12/2009 | Callas et al. | 713/153 |
| 7,712,126 B2 | * | 5/2010 | Andersson et al. | 726/1 |
| 7,721,108 B2 | * | 5/2010 | Pailles et al. | 713/185 |
| 7,814,314 B2 | * | 10/2010 | Gentry et al. | 713/158 |
| 7,840,804 B2 | * | 11/2010 | Oikawa et al. | 713/168 |
| 7,937,754 B2 | * | 5/2011 | Katano et al. | 726/18 |
| 7,984,302 B2 | * | 7/2011 | Fukasawa | 713/177 |
| 8,028,167 B2 | * | 9/2011 | Andersson et al. | 713/175 |
| 8,086,867 B2 | * | 12/2011 | Freeman et al. | 713/186 |
| 8,161,095 B2 | * | 4/2012 | Manion et al. | 709/201 |
| 2002/0062438 A1 | * | 5/2002 | Asay et al. | 713/157 |

(Continued)

FOREIGN PATENT DOCUMENTS

| | | |
|---|---|---|
| JP | 2005124097 A | 5/2005 |
| JP | 2006-287455 A | 10/2006 |

*Primary Examiner* — Carolyn B Kosowski
(74) *Attorney, Agent, or Firm* — Sughrue Mion, PLLC

(57) ABSTRACT

This authentication device includes: a volatile memory; a non-volatile memory which stores a plurality of electronic certificate files; a unit which refers to the non-volatile memory upon start-up, and which stores a hierarchical relationship between the plurality of electronic certificate files in the volatile memory; a unit for searching for a desired electronic certificate file based upon the hierarchical relationship between the plurality of electronic certificate files in the volatile memory; and an authentication unit which performs authentication using the electronic certificate file which has been found by the search unit.

5 Claims, 5 Drawing Sheets

U.S. PATENT DOCUMENTS

| | | | |
|---|---|---|---|
| 2004/0128503 A1* | 7/2004 | Watanabe et al. | 713/157 |
| 2005/0114653 A1* | 5/2005 | Sudia | 713/158 |
| 2005/0154918 A1* | 7/2005 | Engberg | 713/201 |
| 2006/0036849 A1* | 2/2006 | Brown et al. | 713/156 |
| 2009/0259843 A1* | 10/2009 | Gentry et al. | 713/158 |
| 2009/0265547 A1* | 10/2009 | Gentry et al. | 713/158 |
| 2010/0082976 A1* | 4/2010 | Brown et al. | 713/157 |
| 2011/0225643 A1* | 9/2011 | Faynberg et al. | 726/10 |

\* cited by examiner

AUTHENTICATION DEVICE AND METHOD USING ELECTRONIC CERTIFICATE FILES HAVING HIERARCHICAL RELATIONSHIP

BACKGROUND

1. Technical Field

The present invention relates to an authentication technique using a digital signature, and in particular relates to a technique for enhancing the processing speed when performing authentication using an electronic certificate which has been issued by an intermediate certificate authority.

2. Related Art

As an authentication office (hereinafter termed a "CA" or "Certificate Authority") which issues electronic certificates, there are two types: a "root CA" which is treated as a CA which can be trusted, and an "intermediate CA" which is authenticated from a root CA. Thus an intermediate CA is treated, not as a CA which is considered as being trustable just by itself alone, but as a CA which can be trusted by being verified by a root CA. In other words, a hierarchical relationship (a parent-child relationship) is established between the root CA and the intermediate CA.

Furthermore, an intermediate CA can confer authentication upon yet another intermediate CA. In this case, as seen from the root CA, the intermediate CAs constitute a plural hierarchy.

And, as for example shown in FIG. 5, signature data 210 which has been signed by the root CA is appended to an electronic certificate 200 which has been issued by the intermediate CA. Accordingly, when for example performing authentication of downloaded data 300 to which signature data 310 from an intermediate CA is appended, it is necessary first to perform authentication of the signature data 210 of the electronic certificate of the intermediate CA 200 with the electronic certificate of the root CA 100, and thereafter to perform authentication of the signature data 310 of the downloaded data 300 with the electronic certificate of the intermediate CA 200. JP-A-2005-124097 is an example of related art.

SUMMARY

Thus, both an electronic certificate of the intermediate CA for authenticating the downloaded data which has been signed by the intermediate CA and for confirming its legitimacy, and also the electronic certificate of its parent (in this example, that of the root CA) are required. In other words, a plurality of electronic certificates become necessary.

Now, each time such electronic certificates become necessary and their electronic certificate files are downloaded, the authentication processing occupies a certain time period which is required for this downloading. Due to this, such electronic certificate files are generally stored in advance in a non-volatile memory of the authentication device which the user is using, such as a personal computer or the like. Thus a large number of electronic certificate files come to be present in the non-volatile memory. Accordingly, when authenticating downloaded data which has been signed by an intermediate CA, it is necessary to search for the required electronic certificate files rapidly.

Thus, an advantage of some aspects of the invention is to perform authentication processing rapidly using a plurality of electronic certificates which are in a hierarchical relationship.

The authentication device according to an aspect of the invention includes: a volatile memory; a non-volatile memory which stores a plurality of electronic certificate files; a means which refers to the non-volatile memory upon start-up, and which stores a hierarchical relationship between the plurality of electronic certificate files in the volatile memory; a means for searching for a desired electronic certificate file based upon the hierarchical relationship between the plurality of electronic certificate files in the volatile memory; and an authentication means which performs authentication using the electronic certificate file which has been found by the search means.

Due to this, it becomes possible to access these electronic certificate files which have an hierarchical relationship in a rapid manner, and it becomes possible to perform authentication of data which is verified by an intermediate CA at high speed.

In a preferred embodiment it would also be acceptable, if the CA (Certificate Authority) which issued the electronic certificate file is an intermediate CA which has been authenticated by a root CA, for the hierarchical relationship between the plurality of electronic certificate files to be a hierarchical relationship from the intermediate CA to the root CA.

And, in a preferred embodiment, it would also be acceptable for there to be further included an automatic installation means which, when predetermined data has been downloaded from a server which is authenticated by the intermediate CA, stores in the non-volatile memory an electronic certificate file issued by the intermediate CA which has been downloaded along with the downloaded data; and to arrange for the structured entity creation means to append, to a list structured entity in the volatile memory, an information item which corresponds to the electronic certificate file which has been acquired by the automatic installation means.

Moreover, in a preferred embodiment, it would also be acceptable to append identification information to the electronic certificate file which has been installed by the automatic installation means, for identifying an electronic certificate file which has been explicitly installed by the user.

DESCRIPTION OF EXEMPLARY EMBODIMENTS

In the following, an authentication system according to an embodiment of the invention will be explained with reference to the drawings.

Figure 1:
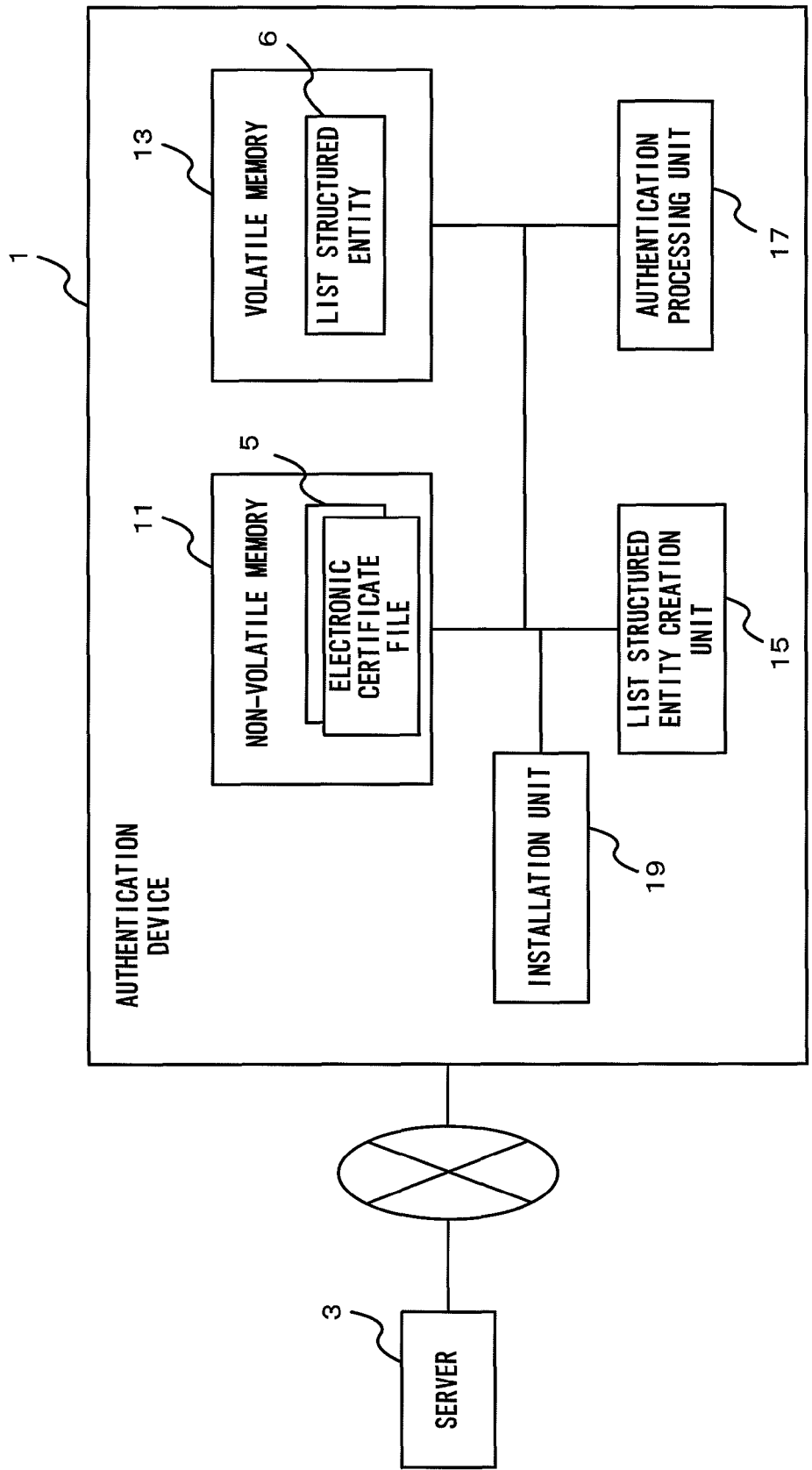
FIG. 1 is a structural diagram of an authentication system according to an embodiment of the invention.

FIG. 1 is a structural diagram of this authentication system according to an embodiment of the invention.

This system comprises an authentication device 1 which authenticates digital signatures using electronic certificates. This authentication device 1 is connected to a server 3 via a network.

The authentication device 1 may be constituted by a general purpose type computer system, and, for example, each of the structural elements and functions of this authentication device 1 in the following explanation may be implemented by execution of an appropriate computer program.

The authentication device 1 comprises a non-volatile memory 11, a volatile memory 13, a list structured entity creation unit 15, an authentication processing unit 17, and an installation processing unit 19.

A plurality of electronic certificate files 5 are stored in the non-volatile memory 11. This installation of the electronic certificate files 5 is performed by the installation processing unit 19.

Thus, the installation processing unit 19 installs the electronic certificate files 5 in the non-volatile memory 11. This installation includes both a type of installation performed by the user himself, in other words a type of installation which is only performed with the explicit approval of the user, and a type of installation which is performed automatically upon acquisition from the server 3, in other words a type of installation for which the explicit approval of the user is not obtained.

For example, when downloading predetermined data from the server 3 which is authenticated by an intermediate CA, along with this data, an electronic certificate file which has been issued by this intermediate CA is also downloaded. And the installation processing unit 19 automatically installs this electronic certificate file in the non-volatile memory 11.

When the installation processing unit 19 has performed automatic installation, it would also be acceptable to arrange to append identification information for distinguishing this electronic certificate file from electronic certificate files which have been installed by the user. By doing this, it would become possible to delete electronic certificate files which have been installed automatically.

A list structured entity 6, in which certificate information related to the electronic certificates 5 which are stored in the non-volatile memory 11 is maintained in a list structure, is stored in a volatile memory 13. The contents stored in this volatile memory 13 is deleted when the supply of electrical current to the volatile memory 13 ceases due to the power supply to the authentication device 1 being turned OFF. Accordingly, the list structured entity 6 is generated each time the authentication device 1 is started up.

The list structured entity creation unit 15 acquires the information about electronic certificates 5 which is stored in the non-volatile memory 11, and creates the list structured entity 6 in the volatile memory 13. This list structured entity creation unit 15 creates this list structured entity 6 when the authentication device 1 starts up. Moreover, when a new electronic certificate file 5 is appended to the non-volatile memory 11, the list structured entity creation unit 15 appends to the list structured entity 6 certificate data related to this electronic certificate which has been appended.

Figure 2:
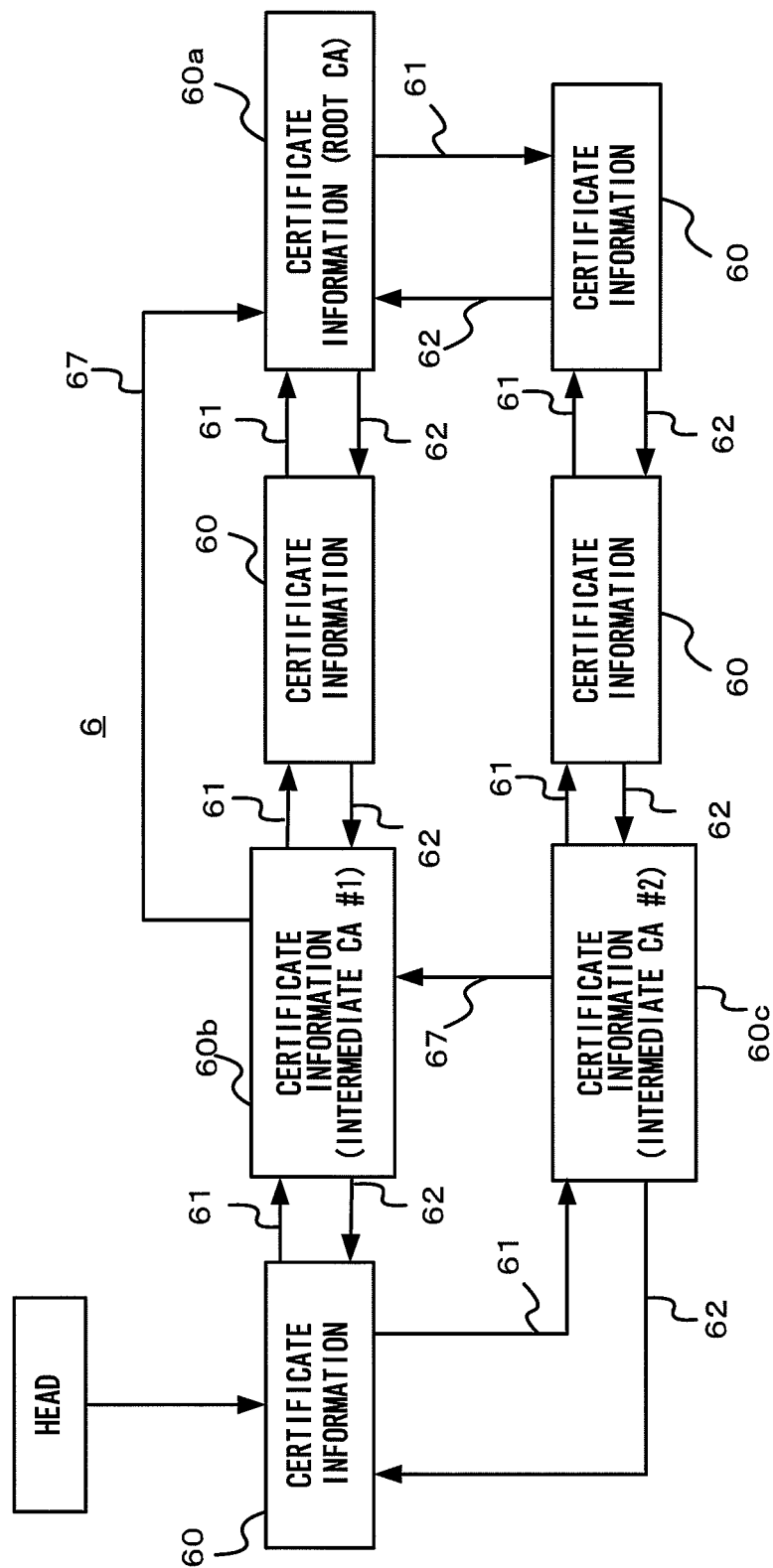
FIG. 2 is a figure showing an example of the structure of a list structured entity 6.

The list structured entity 6 will now be explained with reference to FIG. 2.

This list structured entity 6 is a bidirectional list in which a plurality of nodes 60 are linked bidirectionally. Each of these nodes 60 stores certificate information 60 for the electronic certificates.

Figure 3:
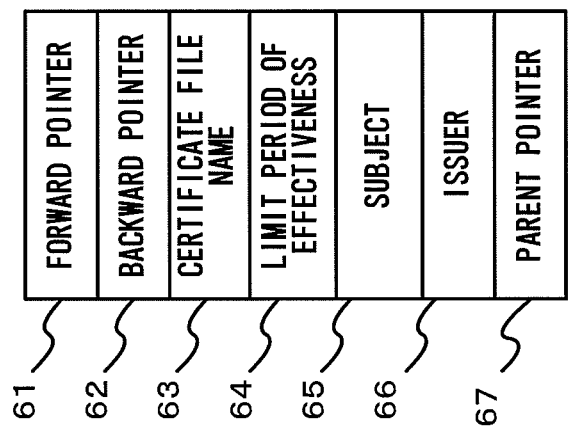
FIG. 3 is a figure showing the data structure of certificate information 60.

The items in the data structure of each item 60 of certificate information are shown in FIG. 3.

This item of certificate information 60 includes a backward pointer 61 to the previous node, a forward pointer 62 to the next item of certificate information, a file name 63 of an electronic certificate file 5, the limit period of effectiveness 64 of this electronic certificate, a subject field 65 which specifies the subject verified by this electronic certificate, an issuer field 66 which specifies the organization issuing this electronic certificate, and, if the issuer field 66 is an intermediate CA, a parent pointer 67 to the node 60 in which the certificate data of the parent CA is stored.

All of the limit period of effectiveness 64, the subject field 65, and the issuer field 66 are described within the electronic certificate file 5, and the identification information of the various CAs is set therein.

It should be understood that, in the case of certificate data 60 of the root CA, both the subject field 65 and the issuer field 66 are set to "root CA". Moreover, in the case of certificate data 60 of an intermediate CA #1 which has the root CA as its parent, then the subject field 65 is set to "intermediate CA #1" while the issuer field 66 is set to "root CA".

Returning now to FIG. 2, along with each of the items of certificate information 60 being linked in both directions by its backward pointer 61 and its forward pointer 62, also the parent pointer 67 is extended from the item of certificate information 60b of the intermediate CA #1 to the item of certificate information 60a of its root CA. In other words, the hierarchical relationships (the parent-child relationships) between the electronic certificates are specified by the parent pointers 67.

Furthermore, in the case of an intermediate CA #2 which is verified by an intermediate CA #1 (in other words, a child CA of the intermediate CA #1), a parent pointer 67 is extended from the certificate information item 60c of the intermediate CA #2 to the certificate information item 60b of the intermediate CA #1.

Due to this, it is possible simply and easily to access the item of certificate information 60a of the root CA via the parent pointers 67 from the items of certificate information 60b and 60c of the intermediate CAs, even without tracing through the list using the backward pointers 61 or the forward pointers 62.

Referring to FIG. 1 for a second time, the authentication processing unit 17 performs authentication of digital signatures by using the electronic certificate files 5 which are stored in the non-volatile memory 11. At this time, the authentication processing unit 17 first refers to the list structured entity 6 in the volatile memory 13 described above, and searches for the item of certificate information 60 of the electronic certificate of the desired CA. In particular, if the desired CA is an intermediate CA so that a parent CA exists, then the authentication processing unit 17 traces through the parent pointers 67 of the electronic certificate information items 60 which have been found, and searches the items of certificate information 60 for the electronic certificates of the parent CAs all together. And it acquires the electronic certificate file 5 based upon the certificate file name 63 of the item of certificate information 60 which has been found and acquired, and performs authentication processing based thereupon.

Figure 4:
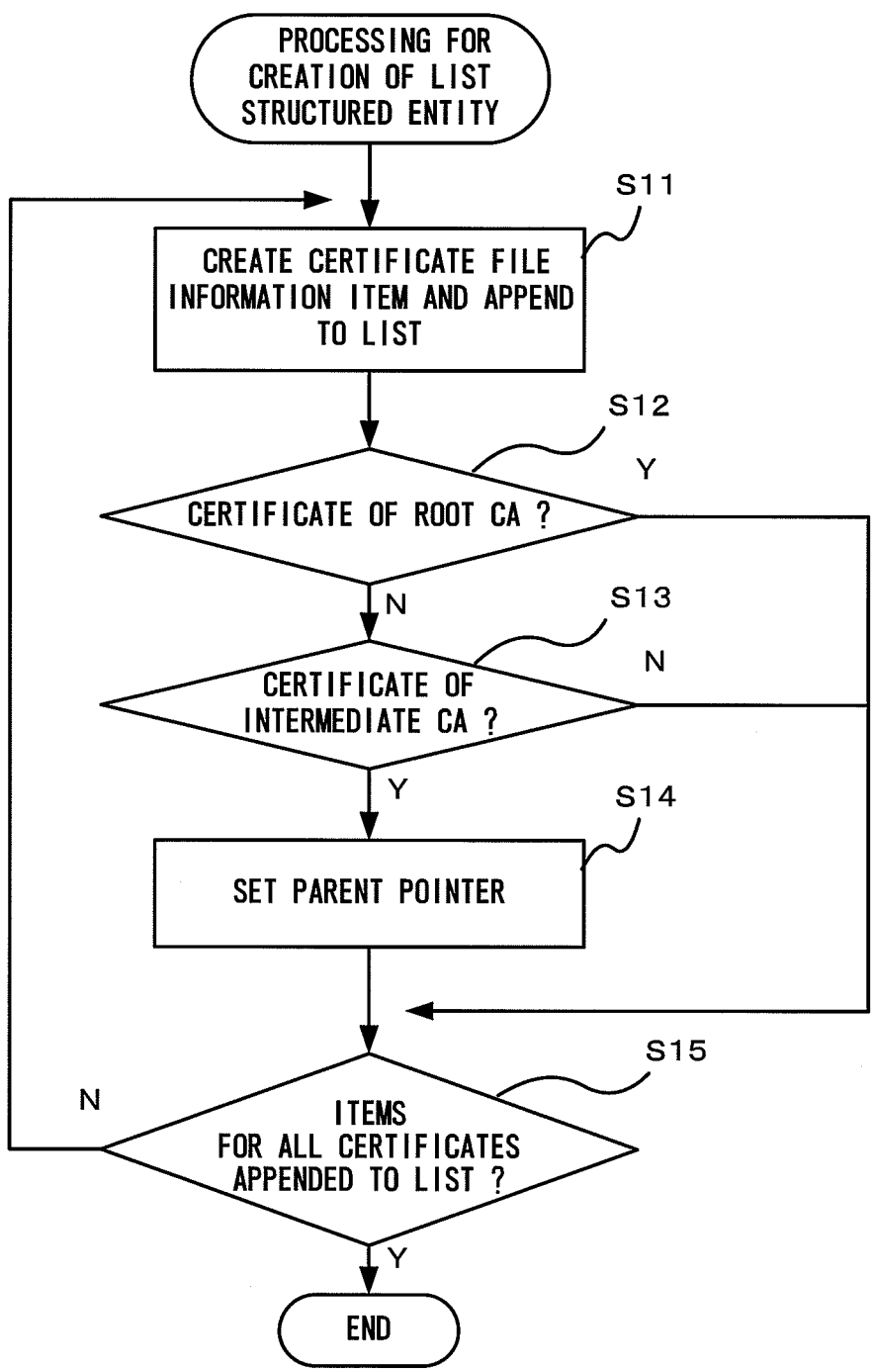
FIG. 4 is a flow chart showing the flow of processing for creating the list structured entity 6 in a volatile memory 13.
Figure 5:
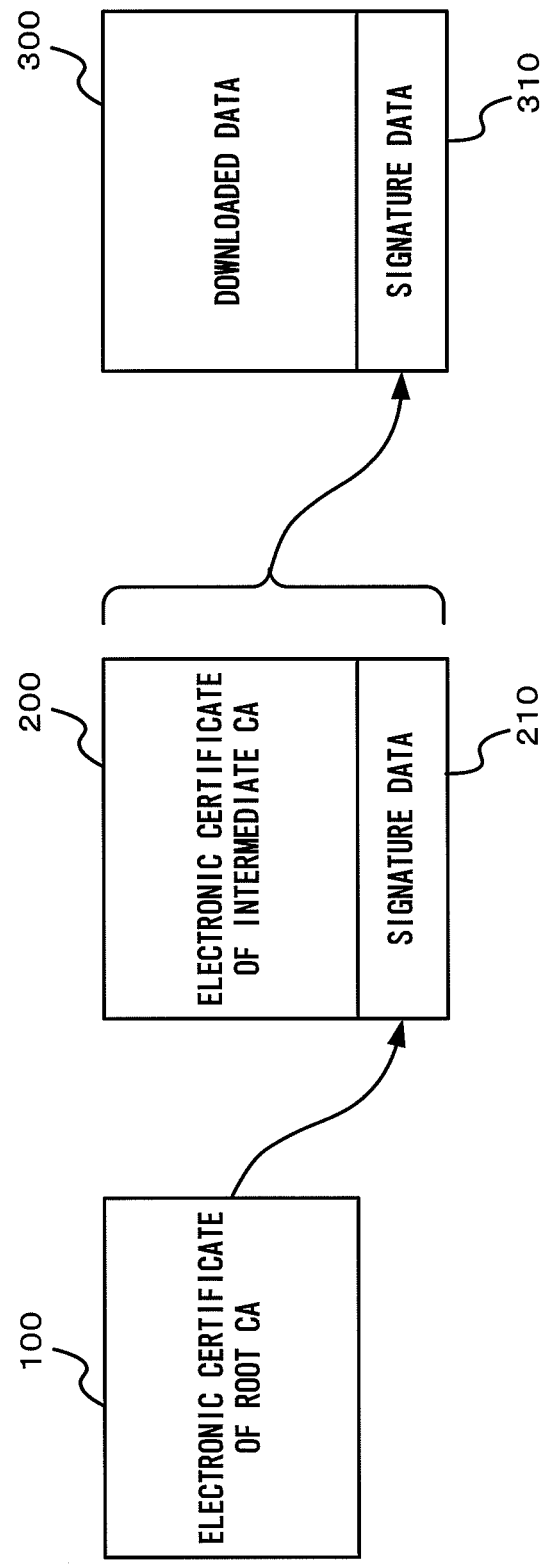
FIG. 5 is a schematic block diagram showing downloaded data which is verified by an intermediate CA which itself is verified by a root CA.

Next, the flow of processing for creating the list structured entity 6 in the volatile memory 13 will be explained using the flow chart of FIG. 4.

When the authentication device 1 has been started up, or when a new certificate file 5 is installed, the following processing is performed.

First, the list structured entity creation unit 15 refers to the non-volatile memory 11, creates an item of file information for an electronic certificate file which is stored therein, and appends it to the list in the volatile memory 13 (a step S11). It should be understood that, if the electronic certificate file is one whose limit period of effectiveness has already lapsed, then no item of certificate information for that certificate file is appended at this time.

The list structured entity creation unit 15 then decides whether or not the item of certificate information 60 which has been appended to the list in the step S11 is one for a root CA (a step S12). For example, if both the subject field 65 and the issuer field 66 are "root CA", then, since this item of certificate information 60 is one for a root CA, accordingly in this step S12 a decision is made using this fact.

If this item of certificate information 60 is not one of a root CA (NO in the step S12), then a decision is made as to whether or not the item of certificate information 60 which was appended in the step S11 is one for an intermediate CA (a step S13). For example, if the subject field 65 and the issuer field 66 are different, then, since this item of certificate information 60 is one for an intermediate CA, accordingly in this step S13 a decision is made using this fact.

If this item of certificate information 60 is one for an intermediate CA (YES in the step S13), then the parent pointer 67 is set (a step S14). In other words, the identification information which is set in the issuer field 66 of the subject certificate data 60 is identification information of its parent CA. Accordingly, for example, a pointer is extended from this subject item of certificate data 60 to the item of certificate information 60, in the subject 65 of which the identification information of this parent CA is set.

If the item of certificate information 60 in the step S12 is one for a root CA (YES in the step S12), then the steps S13 and S14 are skipped. And, if the item of certificate information 60 in the step S13 is not one for an intermediate CA (NO in the step S13), then the step S14 is skipped.

And the above described processing is repeated (a step S15) until items of certificate information 60 for all of the certificate files which are stored in the non-volatile memory 11 are appended to the list structured entity 6.

Since, by doing this, the list structured entity 6 is created and is maintained in the volatile memory 13 when the authentication device 1 is started up, accordingly the authentication processing unit 17 becomes able to access any desired electronic certificate file 5 simply and easily by referring to this list structured entity 6.

The above described embodiment of the invention has only been given by way of example for explanation of the invention; the range of the invention is not to be considered as being limited by the details of that embodiment. A person skilled in the relevant art will be able to implement the invention in various other manners, provided that the gist of the invention is not departed from.

What is claimed is:

1. An authentication device, comprising:
   a volatile memory;
   a non-volatile memory which stores a plurality of electronic certificate files;
   a list structured entity creation unit which creates, upon start-up, a hierarchical relationship information between the plurality of electronic certificate files that is structured by a bidirectional list having a plurality of nodes linked bidirectionally, each of which stores certificate information for the electronic certificate files and has a backward pointer which specifies the previous node, a forward pointer which specifies the next node, and a parent pointer which specifies the parent node of the node, in the volatile memory, based upon the plurality of electronic certificate files in the non-volatile memory;
   an authentication processing unit which searches for a desired electronic certificate file from the plurality of electronic certificate files in the non-volatile memory, based upon the hierarchical relationship information between the plurality of electronic certificate files, the hierarchical relationship information being structured by the bidirectional list comprising the parent pointer and being present in the volatile memory, and which performs authentication using the electronic certificate file which has been found by the search,
   wherein the list structured entity creation unit is implemented by a computer.

2. An authentication device according to claim 1, wherein, if a certificate authority (CA) which issued the electronic certificate file is an intermediate CA which has been authenticated by a root CA, the hierarchical relationship between the plurality of electronic certificate files is a hierarchical relationship from the intermediate CA to the root CA.

3. An authentication device according to claim 2, further comprising:
   an installation processing unit which, when predetermined data has been downloaded from a server which is authenticated by the intermediate CA, stores in the non-volatile memory an electronic certificate file issued by the intermediate CA which has been downloaded along with the downloaded data,
   wherein the list structured entity creation unit appends, to a list structured entity in the volatile memory, an information item which corresponds to the electronic certificate file which has been acquired by the installation processing unit.

4. An authentication device according to claim 3, wherein identification information is appended to the electronic certificate file which has been installed by the installation processing unit, and
   the identification information identifies an electronic certificate file which has been explicitly installed by the user.

5. An authentication method performed by an authentication device which comprises a volatile memory and a non-volatile memory which stores a plurality of electronic certificate files, the method comprising:
   creating, upon start-up of the authentication device, a hierarchical relationship information between the plurality of electronic certificate files that is structured by a bidirectional list having a plurality of nodes linked bidirectionally, each of which stores certificate information for the electronic certificate files and has a backward pointer which specifies the previous node, a forward pointer which specifies the next node, and a parent pointer which specifies the parent node for the node, in the volatile memory, based upon the plurality of electronic certificate files in the non-volatile memory;
   searching for a desired electronic certificate file from the plurality of electronic certificate files in the non-volatile memory, by referring to the hierarchical relationship information between the plurality of electronic certificate files, the hierarchical relationship information being structured by the bidirectional list comprising the parent pointer and being present in the volatile memory; and
   performing authentication using the electronic certificate file which has been found.

* * * * *